(12) United States Patent
Chen et al.

(10) Patent No.: US 9,088,898 B2
(45) Date of Patent: Jul. 21, 2015

(54) SYSTEM AND METHOD FOR COOPERATIVE SCHEDULING FOR CO-LOCATED ACCESS POINTS

(71) Applicant: Magnolia Broadband Inc., Englewood, NJ (US)

(72) Inventors: Phil F. Chen, Denville, NJ (US); Haim Harel, New York, NY (US); Kenneth Kludt, San Jose, CA (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 14/198,155

(22) Filed: Mar. 5, 2014

(65) Prior Publication Data

US 2015/0071186 A1    Mar. 12, 2015

Related U.S. Application Data

(60) Provisional application No. 61/877,142, filed on Sep. 12, 2013.

(51) Int. Cl.
*H04W 16/14* (2009.01)

(52) U.S. Cl.
CPC ...................... *H04W 16/14* (2013.01)

(58) Field of Classification Search
CPC ..................................................... H04W 16/14
See application file for complete search history.

(56) References Cited

U.S. PATENT DOCUMENTS 4,044,359 A    8/1977    Applebaum et al.
4,079,318 A    3/1978    Kinoshita
4,359,738 A    11/1982   Lewis
4,540,985 A    9/1985    Clancy et al.
4,628,320 A    12/1986   Downie
5,162,805 A    11/1992   Cantrell
5,363,104 A    11/1994   Richmond
5,444,762 A    8/1995    Frey et al.
5,732,075 A    3/1998    Tangemann et al.
5,915,215 A    6/1999    Williams et al.
5,936,577 A    8/1999    Shoki et al.
5,940,033 A    8/1999    Locher et al.

(Continued)

FOREIGN PATENT DOCUMENTS

EP    1 189 303    3/2002
EP    1 867 177    5/2010

(Continued)

OTHER PUBLICATIONS

Office Action issued by the United States Patent and Trademark Office for U.S. Appl. No. 13/630,146 dated Jan. 22, 2013.

(Continued)

*Primary Examiner* — Andrew Lai
*Assistant Examiner* — Hoyet H Andrews
(74) *Attorney, Agent, or Firm* — Pearl Cohen Zedek Latzer Baratz LLP

(57) ABSTRACT

Systems and methods of scheduling data for transmission from an access point "AP" to a station in a system of multiple co-located APs may include determining whether the station is also able to receive transmitted data from another of the multiple co-located APs. If the determining is negative the data is transmitted but if the determination is positive, the data may be transmitted only after ascertaining that exclusive permission to transmit the data to the station has been granted to the AP.

17 Claims, 9 Drawing Sheets

(56) References Cited

U.S. PATENT DOCUMENTS

| | | | |
|---|---|---|---|
| 6,018,317 A | 1/2000 | Dogan et al. | |
| 6,026,081 A * | 2/2000 | Hamabe | 370/335 |
| 6,046,655 A | 4/2000 | Cipolla | |
| 6,101,399 A | 8/2000 | Raleigh et al. | |
| 6,163,695 A * | 12/2000 | Takemura | 455/456.4 |
| 6,167,286 A | 12/2000 | Ward et al. | |
| 6,215,812 B1 | 4/2001 | Young et al. | |
| 6,226,507 B1 | 5/2001 | Ramesh et al. | |
| 6,230,123 B1 | 5/2001 | Mekuria et al. | |
| 6,259,683 B1 * | 7/2001 | Sekine et al. | 370/328 |
| 6,297,772 B1 | 10/2001 | Lewis | |
| 6,321,077 B1 | 11/2001 | Saitoh et al. | |
| 6,335,953 B1 | 1/2002 | Sanderford et al. | |
| 6,370,378 B1 * | 4/2002 | Yahagi | 455/433 |
| 6,377,783 B1 | 4/2002 | Lo et al. | |
| 6,393,282 B1 * | 5/2002 | Iimori | 455/432.1 |
| 6,584,115 B1 | 6/2003 | Suzuki | |
| 6,697,622 B1 * | 2/2004 | Ishikawa et al. | 455/434 |
| 6,697,633 B1 | 2/2004 | Dogan et al. | |
| 6,834,073 B1 | 12/2004 | Miller et al. | |
| 6,842,460 B1 | 1/2005 | Olkkonen et al. | |
| 6,914,890 B1 * | 7/2005 | Tobita et al. | 370/338 |
| 6,927,646 B2 | 8/2005 | Niemi | |
| 6,975,582 B1 | 12/2005 | Karabinis et al. | |
| 6,987,958 B1 | 1/2006 | Lo et al. | |
| 7,068,628 B2 | 6/2006 | Li et al. | |
| 7,177,663 B2 | 2/2007 | Axness et al. | |
| 7,190,964 B2 * | 3/2007 | Damnjanovic et al. | 455/522 |
| 7,257,425 B2 | 8/2007 | Wang et al. | |
| 7,299,072 B2 | 11/2007 | Ninomiya | |
| 7,391,757 B2 | 6/2008 | Haddad et al. | |
| 7,392,015 B1 | 6/2008 | Farlow et al. | |
| 7,474,676 B2 | 1/2009 | Tao et al. | |
| 7,499,109 B2 | 3/2009 | Kim et al. | |
| 7,512,083 B2 | 3/2009 | Li | |
| 7,606,528 B2 | 10/2009 | Mesecher | |
| 7,634,015 B2 | 12/2009 | Waxman | |
| 7,646,744 B2 | 1/2010 | Li | |
| 7,719,993 B2 | 5/2010 | Li et al. | |
| 7,742,000 B2 | 6/2010 | Mohamadi | |
| 7,769,107 B2 | 8/2010 | Sandhu et al. | |
| 7,898,478 B2 | 3/2011 | Niu et al. | |
| 7,904,086 B2 * | 3/2011 | Kundu et al. | 455/436 |
| 7,933,255 B2 | 4/2011 | Li | |
| 7,970,366 B2 | 6/2011 | Arita et al. | |
| 8,078,109 B1 | 12/2011 | Mulcay | |
| 8,103,284 B2 * | 1/2012 | Mueckenheim et al. | 455/453 |
| 8,115,679 B2 | 2/2012 | Falk | |
| 8,155,613 B2 | 4/2012 | Kent et al. | |
| 8,275,377 B2 * | 9/2012 | Nanda et al. | 455/436 |
| 8,280,443 B2 | 10/2012 | Tao et al. | |
| 8,294,625 B2 | 10/2012 | Kittinger et al. | |
| 8,306,012 B2 | 11/2012 | Lindoff et al. | |
| 8,315,671 B2 | 11/2012 | Kuwahara et al. | |
| 8,369,436 B2 | 2/2013 | Stirling-Gallacher | |
| 8,509,190 B2 | 8/2013 | Rofougaran | |
| 8,520,657 B2 | 8/2013 | Rofougaran | |
| 8,526,886 B2 | 9/2013 | Wu et al. | |
| 8,588,844 B2 * | 11/2013 | Shpak | 455/525 |
| 8,599,955 B1 | 12/2013 | Kludt et al. | |
| 8,599,979 B2 | 12/2013 | Farag et al. | |
| 8,644,413 B2 | 2/2014 | Harel et al. | |
| 8,649,458 B2 | 2/2014 | Kludt et al. | |
| 8,666,319 B2 | 3/2014 | Kloper et al. | |
| 8,744,511 B2 | 6/2014 | Jones et al. | |
| 8,767,862 B2 | 7/2014 | Abreu et al. | |
| 8,780,743 B2 | 7/2014 | Sombrutzki et al. | |
| 8,942,134 B1 | 1/2015 | Kludt et al. | |
| 2001/0029326 A1 | 10/2001 | Diab et al. | |
| 2001/0038665 A1 | 11/2001 | Baltersee et al. | |
| 2002/0024975 A1 | 2/2002 | Hendler | |
| 2002/0051430 A1 | 5/2002 | Kasami et al. | |
| 2002/0065107 A1 | 5/2002 | Harel et al. | |
| 2002/0085643 A1 | 7/2002 | Kitchener et al. | |
| 2002/0107013 A1 | 8/2002 | Fitzgerald | |
| 2002/0115474 A1 | 8/2002 | Yoshino et al. | |
| 2002/0181426 A1 | 12/2002 | Sherman | |
| 2002/0181437 A1 * | 12/2002 | Ohkubo et al. | 370/349 |
| 2003/0087645 A1 | 5/2003 | Kim et al. | |
| 2003/0114162 A1 | 6/2003 | Chheda et al. | |
| 2003/0153322 A1 | 8/2003 | Burke et al. | |
| 2003/0153360 A1 | 8/2003 | Burke et al. | |
| 2003/0186653 A1 * | 10/2003 | Mohebbi et al. | 455/67.11 |
| 2003/0203717 A1 | 10/2003 | Chuprun et al. | |
| 2003/0203743 A1 | 10/2003 | Sugar et al. | |
| 2004/0056795 A1 | 3/2004 | Ericson et al. | |
| 2004/0063455 A1 * | 4/2004 | Eran et al. | 455/525 |
| 2004/0081144 A1 | 4/2004 | Martin et al. | |
| 2004/0121810 A1 | 6/2004 | Goransson et al. | |
| 2004/0125899 A1 | 7/2004 | Li et al. | |
| 2004/0125900 A1 | 7/2004 | Liu et al. | |
| 2004/0142696 A1 | 7/2004 | Saunders et al. | |
| 2004/0147266 A1 * | 7/2004 | Hwang et al. | 455/445 |
| 2004/0156399 A1 * | 8/2004 | Eran | 370/913 |
| 2004/0166902 A1 | 8/2004 | Castellano et al. | |
| 2004/0198292 A1 | 10/2004 | Smith et al. | |
| 2004/0228388 A1 | 11/2004 | Salmenkaita | |
| 2004/0235527 A1 | 11/2004 | Reudink et al. | |
| 2004/0264504 A1 | 12/2004 | Jin | |
| 2005/0068230 A1 | 3/2005 | Munoz et al. | |
| 2005/0068918 A1 | 3/2005 | Mantravadi et al. | |
| 2005/0075140 A1 | 4/2005 | Famolari | |
| 2005/0129155 A1 | 6/2005 | Hoshino | |
| 2005/0147023 A1 | 7/2005 | Stephens et al. | |
| 2005/0163097 A1 * | 7/2005 | Do et al. | 370/349 |
| 2005/0245224 A1 | 11/2005 | Kurioka | |
| 2005/0250544 A1 | 11/2005 | Grant et al. | |
| 2005/0254513 A1 | 11/2005 | Cave et al. | |
| 2005/0265436 A1 | 12/2005 | Suh et al. | |
| 2005/0287962 A1 | 12/2005 | Mehta et al. | |
| 2005/0287962 A1 | 12/2005 | Strutt et al. | |
| 2006/0041676 A1 | 2/2006 | Sherman | |
| 2006/0092889 A1 | 5/2006 | Lyons et al. | |
| 2006/0094372 A1 | 5/2006 | Ahn et al. | |
| 2006/0098605 A1 | 5/2006 | Li | |
| 2006/0111149 A1 | 5/2006 | Chitrapu et al. | |
| 2006/0135097 A1 | 6/2006 | Wang et al. | |
| 2006/0183503 A1 | 8/2006 | Jeffrey Goldberg | |
| 2006/0203850 A1 * | 9/2006 | Johnson et al. | 370/503 |
| 2006/0227854 A1 | 10/2006 | McCloud et al. | |
| 2006/0264184 A1 | 11/2006 | Li et al. | |
| 2006/0270343 A1 | 11/2006 | Cha et al. | |
| 2006/0271969 A1 | 11/2006 | Takizawa et al. | |
| 2006/0285507 A1 | 12/2006 | Kinder et al. | |
| 2007/0041398 A1 | 2/2007 | Benveniste | |
| 2007/0058581 A1 | 3/2007 | Benveniste | |
| 2007/0076675 A1 | 4/2007 | Chen | |
| 2007/0093261 A1 | 4/2007 | Hou et al. | |
| 2007/0097918 A1 * | 5/2007 | Cai et al. | 370/331 |
| 2007/0115882 A1 | 5/2007 | Wentink | |
| 2007/0115914 A1 * | 5/2007 | Ohkubo et al. | 370/349 |
| 2007/0152903 A1 | 7/2007 | Lin et al. | |
| 2007/0217352 A1 | 9/2007 | Kwon | |
| 2007/0223380 A1 | 9/2007 | Gilbert et al. | |
| 2007/0249386 A1 | 10/2007 | Bennett | |
| 2008/0043867 A1 | 2/2008 | Blanz et al. | |
| 2008/0051037 A1 | 2/2008 | Molnar et al. | |
| 2008/0095163 A1 * | 4/2008 | Chen et al. | 370/392 |
| 2008/0108352 A1 * | 5/2008 | Montemurro et al. | 455/437 |
| 2008/0125120 A1 | 5/2008 | Gallagher et al. | |
| 2008/0144737 A1 | 6/2008 | Naguib | |
| 2008/0165732 A1 | 7/2008 | Kim et al. | |
| 2008/0238808 A1 | 10/2008 | Arita et al. | |
| 2008/0240314 A1 | 10/2008 | Gaal et al. | |
| 2008/0267142 A1 | 10/2008 | Mushkin et al. | |
| 2008/0280571 A1 | 11/2008 | Rofougaran et al. | |
| 2008/0285637 A1 | 11/2008 | Liu et al. | |
| 2009/0003299 A1 | 1/2009 | Cave et al. | |
| 2009/0028225 A1 | 1/2009 | Runyon et al. | |
| 2009/0046638 A1 | 2/2009 | Rappaport et al. | |
| 2009/0058724 A1 | 3/2009 | Xia et al. | |
| 2009/0121935 A1 | 5/2009 | Xia et al. | |
| 2009/0137206 A1 | 5/2009 | Sherman et al. | |
| 2009/0154419 A1 | 6/2009 | Yoshida et al. | |

(56) References Cited

U.S. PATENT DOCUMENTS

| | | |
|---|---|---|
| 2009/0187661 A1 | 7/2009 | Sherman |
| 2009/0190541 A1 | 7/2009 | Abedi |
| 2009/0227255 A1* | 9/2009 | Thakare .................. 455/434 |
| 2009/0239486 A1 | 9/2009 | Sugar et al. |
| 2009/0268616 A1 | 10/2009 | Hosomi |
| 2009/0285331 A1 | 11/2009 | Sugar et al. |
| 2009/0322610 A1 | 12/2009 | Hants et al. |
| 2009/0322613 A1 | 12/2009 | Bala et al. |
| 2009/0323608 A1 | 12/2009 | Adachi et al. |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0067473 A1 | 3/2010 | Cave et al. |
| 2010/0111039 A1* | 5/2010 | Kim et al. .................. 370/331 |
| 2010/0117890 A1 | 5/2010 | Vook et al. |
| 2010/0135420 A1 | 6/2010 | Xu et al. |
| 2010/0150013 A1 | 6/2010 | Hara et al. |
| 2010/0172429 A1 | 7/2010 | Nagahama et al. |
| 2010/0195560 A1 | 8/2010 | Nozaki et al. |
| 2010/0195601 A1 | 8/2010 | Zhang |
| 2010/0208712 A1 | 8/2010 | Wax et al. |
| 2010/0222011 A1 | 9/2010 | Behzad |
| 2010/0232355 A1* | 9/2010 | Richeson et al. .............. 370/328 |
| 2010/0234071 A1 | 9/2010 | Shabtay et al. |
| 2010/0278063 A1 | 11/2010 | Kim et al. |
| 2010/0283692 A1 | 11/2010 | Achour et al. |
| 2010/0285752 A1 | 11/2010 | Lakshmanan et al. |
| 2010/0291931 A1* | 11/2010 | Suemitsu et al. .............. 455/436 |
| 2010/0303170 A1 | 12/2010 | Zhu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0085465 A1* | 4/2011 | Lindoff et al. ................. 370/252 |
| 2011/0085532 A1 | 4/2011 | Scherzer et al. |
| 2011/0105036 A1 | 5/2011 | Rao et al. |
| 2011/0116489 A1 | 5/2011 | Grandhi |
| 2011/0134816 A1 | 6/2011 | Liu et al. |
| 2011/0150050 A1 | 6/2011 | Trigui et al. |
| 2011/0150066 A1 | 6/2011 | Fujimoto |
| 2011/0151826 A1* | 6/2011 | Miller et al. ................ 455/404.1 |
| 2011/0163913 A1 | 7/2011 | Cohen et al. |
| 2011/0205883 A1 | 8/2011 | Mihota |
| 2011/0205998 A1 | 8/2011 | Hart et al. |
| 2011/0228742 A1 | 9/2011 | Honkasalo et al. |
| 2011/0249576 A1 | 10/2011 | Chrisikos et al. |
| 2011/0250884 A1* | 10/2011 | Brunel et al. .................. 455/434 |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2011/0310827 A1 | 12/2011 | Srinivasa et al. |
| 2011/0310853 A1 | 12/2011 | Yin et al. |
| 2012/0014377 A1 | 1/2012 | Joergensen et al. |
| 2012/0015603 A1 | 1/2012 | Proctor et al. |
| 2012/0020396 A1 | 1/2012 | Hohne et al. |
| 2012/0027000 A1 | 2/2012 | Wentink |
| 2012/0028638 A1* | 2/2012 | Mueck et al. ................ 455/426.1 |
| 2012/0028655 A1* | 2/2012 | Mueck et al. ................ 455/456.6 |
| 2012/0028671 A1 | 2/2012 | Niu et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0051287 A1 | 3/2012 | Merlin et al. |
| 2012/0064838 A1 | 3/2012 | Miao et al. |
| 2012/0069828 A1 | 3/2012 | Taki et al. |
| 2012/0076028 A1 | 3/2012 | Ko et al. |
| 2012/0076229 A1 | 3/2012 | Brobston et al. |
| 2012/0088512 A1 | 4/2012 | Yamada et al. |
| 2012/0092217 A1 | 4/2012 | Hosoya et al. |
| 2012/0100802 A1 | 4/2012 | Mohebbi |
| 2012/0115523 A1* | 5/2012 | Shpak ..................... 455/507 |
| 2012/0155349 A1 | 6/2012 | Bajic et al. |
| 2012/0155397 A1 | 6/2012 | Shaffer et al. |
| 2012/0163257 A1 | 6/2012 | Kim et al. |
| 2012/0163302 A1 | 6/2012 | Takano |
| 2012/0170453 A1 | 7/2012 | Tiwari |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1 | 8/2012 | Petersson et al. |
| 2012/0213065 A1 | 8/2012 | Koo et al. |
| 2012/0218962 A1 | 8/2012 | Kishiyama et al. |
| 2012/0220331 A1 | 8/2012 | Luo et al. |
| 2012/0230380 A1 | 9/2012 | Keusgen et al. |
| 2012/0251031 A1 | 10/2012 | Suarez et al. |
| 2012/0270531 A1 | 10/2012 | Wright et al. |
| 2012/0270544 A1 | 10/2012 | Shah |
| 2012/0281598 A1 | 11/2012 | Struhsaker et al. |
| 2012/0314570 A1 | 12/2012 | Forenza et al. |
| 2012/0321015 A1 | 12/2012 | Hansen et al. |
| 2012/0327870 A1 | 12/2012 | Grandhi et al. |
| 2013/0010623 A1 | 1/2013 | Golitschek |
| 2013/0017794 A1 | 1/2013 | Kloper et al. |
| 2013/0023225 A1 | 1/2013 | Weber |
| 2013/0044877 A1 | 2/2013 | Liu et al. |
| 2013/0051283 A1 | 2/2013 | Lee et al. |
| 2013/0058239 A1 | 3/2013 | Wang et al. |
| 2013/0070741 A1 | 3/2013 | Li et al. |
| 2013/0079048 A1 | 3/2013 | Cai et al. |
| 2013/0094437 A1 | 4/2013 | Bhattacharya |
| 2013/0094621 A1 | 4/2013 | Luo et al. |
| 2013/0095780 A1 | 4/2013 | Prazan et al. |
| 2013/0101073 A1 | 4/2013 | Zai et al. |
| 2013/0150012 A1* | 6/2013 | Chhabra et al. ............... 455/418 |
| 2013/0156016 A1 | 6/2013 | Debnath et al. |
| 2013/0156120 A1 | 6/2013 | Josiam et al. |
| 2013/0170388 A1 | 7/2013 | Ito et al. |
| 2013/0172029 A1 | 7/2013 | Chang et al. |
| 2013/0190006 A1 | 7/2013 | Kazmi et al. |
| 2013/0208587 A1 | 8/2013 | Bala et al. |
| 2013/0208619 A1 | 8/2013 | Kudo et al. |
| 2013/0223400 A1 | 8/2013 | Seo et al. |
| 2013/0229996 A1 | 9/2013 | Wang et al. |
| 2013/0229999 A1 | 9/2013 | Da Silva et al. |
| 2013/0235720 A1 | 9/2013 | Wang et al. |
| 2013/0242853 A1 | 9/2013 | Seo et al. |
| 2013/0242899 A1* | 9/2013 | Lysejko et al. ................ 370/329 |
| 2013/0242965 A1 | 9/2013 | Horn et al. |
| 2013/0242976 A1 | 9/2013 | Katayama et al. |
| 2013/0252621 A1* | 9/2013 | Dimou et al. .................. 455/450 |
| 2013/0272437 A1 | 10/2013 | Eidson et al. |
| 2013/0301551 A1 | 11/2013 | Ghosh et al. |
| 2013/0331136 A1 | 12/2013 | Yang et al. |
| 2013/0343369 A1 | 12/2013 | Yamaura |
| 2014/0010089 A1 | 1/2014 | Cai et al. |
| 2014/0010211 A1 | 1/2014 | Asterjadhi et al. |
| 2014/0029433 A1 | 1/2014 | Wentink |
| 2014/0071873 A1 | 3/2014 | Wang et al. |
| 2014/0086077 A1 | 3/2014 | Safavi |
| 2014/0086081 A1 | 3/2014 | Mack et al. |
| 2014/0098681 A1 | 4/2014 | Stager et al. |
| 2014/0119288 A1 | 5/2014 | Zhu et al. |
| 2014/0185501 A1 | 7/2014 | Park et al. |
| 2014/0185535 A1 | 7/2014 | Park et al. |
| 2014/0192820 A1 | 7/2014 | Azizi et al. |
| 2014/0204821 A1 | 7/2014 | Seok et al. |
| 2014/0241182 A1* | 8/2014 | Smadi ..................... 370/252 |
| 2014/0307653 A1* | 10/2014 | Liu et al. .................. 370/329 |

FOREIGN PATENT DOCUMENTS

| | | |
|---|---|---|
| EP | 2 234 355 | 9/2010 |
| EP | 2 498 462 | 9/2012 |
| JP | 2009-182441 | 8/2009 |
| JP | 2009-278444 | 11/2009 |
| WO | WO 03/047033 | 6/2003 |
| WO | WO 03/073645 | 9/2003 |
| WO | WO 2010/085854 | 8/2010 |

(56) References Cited

FOREIGN PATENT DOCUMENTS

WO    WO 2011/060058    5/2011
WO    WO 2013/192112    12/2013

OTHER PUBLICATIONS

Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.
Office Action issued by the United States Patent and Trademark Office for U.S. Appl. No. 14/085,252 dated Jun. 18, 2014.
Office Action issued by the United States Patent and Trademark Office for U.S. Appl. No. 14/094,644 dated Jun. 24, 2014.
Notice of Allowance issued by the United States Patent and Trademark Office for U.S. Appl. No. 14/102,539 dated Jun. 24, 2014.
Office Action issued by the United States Patent and Trademark Office for U.S. Appl. No. 14/011,521 dated Jul. 1, 2014.
Notice of Allowance issued by the United States Patent and Trademark Office for U.S. Appl. No. 14/109,904 dated Jul. 2, 2014.
Notice of Allowance issued by the United States Patent and Trademark Office for U.S. Appl. No. 13/889,150 dated Jul. 8, 2014.
Office Action issued by the United States Patent and Trademark Office for U.S. Appl. No. 14/250,767 dated Jul. 10, 2014.
Notice of Allowance issued by the United States Patent and Trademark Office for U.S. Appl. No. 14/085,352 dated Jul. 23, 2014.
Notice of Allowance issued by the United States Patent and Trademark Office for U.S. Appl. No. 14/013,190 dated Jul. 25, 2014.
Office Action issued by the United States Patent and Trademark Office for U.S. Appl. No. 14/198,280 dated Jul. 29, 2014.
Office Action issued by the United States Patent and Trademark Office for U.S. Appl. No. 14/042,020 dated Jul. 31, 2014.
Notice of Allowance issued by the United States Patent and Trademark Office for U.S. Appl. No. 14/010,771 dated Aug. 6, 2014.
Office Action issued by the United States Patent and Trademark Office for U.S. Appl. No. 14/306,458 dated Aug. 13, 2014.
Office Action issued by the United States Patent and Trademark Office for U.S. Appl. No. 14/297,898 dated Aug. 15, 2014.
Notice of Allowance issued by the United States Patent and Trademark Office for U.S. Appl. No. 14/085,252 dated Aug. 27, 2014.
Office Action issued by the United States Patent and Trademark Office for U.S. Appl. No. 14/181,844 dated Aug. 29, 2014.
Office Action issued by the United States Patent and Trademark Office for U.S. Appl. No. 14/296,209 dated Sep. 4, 2014.

(56) References Cited

OTHER PUBLICATIONS

Notice of Allowance issued by the United States Patent and Trademark Office for U.S. Appl. No. 14/097,765 dated Sep. 8, 2014.
Notice of Allowance issued by the United States Patent and Trademark Office for U.S. Appl. No. 14/143,580 dated Sep. 8, 2014.
Office Action issued by the United States Patent and Trademark Office for U.S. Appl. No. 14/173,640 dated Oct. 6, 2014.
Office Action issued by the United States Patent and Trademark Office for U.S. Appl. No. 14/449,431 dated Oct. 10, 2014.
Office Action issued by the United States Patent and Trademark Office for U.S. Appl. No. 14/171,736 dated Oct. 16, 2014.
Notice of Allowance issued by the United States Patent and Trademark Office for U.S. Appl. No. 14/011,521 dated Oct. 20, 2014.
Office Action issued by the United States Patent and Trademark Office for U.S. Appl. No. 14/320,920 dated Oct. 23, 2014.
Notice of Allowance issued by the United States Patent and Trademark Office for U.S. Appl. No. 13/889,150 dated Nov. 10, 2014.
Office Action issued by the United States Patent and Trademark Office for U.S. Appl. No. 13/775,886 dated Nov. 17, 2014.
Notice of Allowance issued by the United States Patent and Trademark Office for U.S. Appl. No. 14/198,280 dated Nov. 18, 2014.
Office Action issued by the United States Patent and Trademark Office for U.S. Appl. No. 14/480,920 dated Nov. 18, 2014.
Office Action issued by the United States Patent and Trademark Office for U.S. Appl. No. 14/481,319 dated Nov. 19, 2014.
Office Action issued by the United States Patent and Trademark Office for U.S. Appl. No. 14/273,866 dated Nov. 28, 2014.
Office Action issued by the United States Patent and Trademark Office for U.S. Appl. No. 14/042,020 dated Dec. 1, 2014.
Office Action issued by the United States Patent and Trademark Office for U.S. Appl. No. 13/888,057 dated Dec. 3, 2014.
Notice of Allowance issued by the United States Patent and Trademark Office for U.S. Appl. No. 14/297,898 dated Dec. 5, 2014.
Notice of Allowance issued by the United States Patent and Trademark Office for U.S. Appl. No. 14/296,209 dated Jan. 27, 2015.
International Search Report and Written Opinion for PCT International Application No. PCT/US2014/064346 dated Jan. 29, 2015.
Mitsubishi Electric, "Discussion on Antenna Calibration in TDD", 3GPP Draft; R1-090043, $3^{rd}$ Generation Partnership Project (3GPP), Mobile Competence Centre; 650, Route Des Lucioles; F-06921 Sophia-Antipolis Cedex; France, No. Ljubljana; 20090107, Jan. 7, 2009, pp. 1-4.
Alcatel-Lucent Shanghai Bell et al., "Antenna Array Calibration for TDD CoMP", 3GPP Draft; R1-100427, $3^{rd}$ Generation Partnership Project (3GPP), Mobile Competence Centre; 650, Route Des Lucioles; F-06921 Sophia-Antipolis Cedex; France, vol. RAN WG1, No. Valencia, Spain; 20100118, Jan. 12, 2010, pp. 1-5.
Notice of Allowance issued by the United States Patent and Trademark Office for U.S. Appl. No. 13/925,454 dated Feb. 3, 2015.
Office Action issued by the United States Patent and Trademark Office for U.S. Appl. No. 14/173,640 dated Feb. 3, 2015.
International Search Report and Written Opinion for PCT International Application No. PCT/US2014/064185 dated Feb. 5, 2015.
Kai Yang et al., "Coordinated Dual-Layer Beamforming for Public Safety Network: Architecture and Algorithms", Communications (ICC), 2012 IEEE International Conference On, IEEE, Jun. 10, 2012, pp. 4095-4099.
Songtao et al., "A Distributed Adaptive GSC Beamformer over Coordinated Antenna Arrays Network for Interference Mitigation", Asilomar Conference on Signals, Systems and Computers, Conference Record, IEEE Computer Society, US, Nov. 4, 2012, pp. 237-242.
International Search Report and Written Opinion for PCT International Application No. PCT/US2014/065635 dated Feb. 13, 2015.
Notice of Allowance issued by the United States Patent and Trademark Office for U.S. Appl. No. 14/171,736 mailed Feb. 20, 2015.
Office Action issued by the United States Patent and Trademark Office for U.S. Appl. No. 14/320,920 dated Feb. 23, 2015.
Office Action issued by the United States Patent and Trademark Office for U.S. Appl. No. 13/775,886 dated Mar. 23, 2015.
Notice of Allowance issued by the United States Patent and Trademark Office for U.S. Appl. No. 14/449,431 dated Mar. 23, 2015.
Notice of Allowance issued by the United States Patent and Trademark Office for U.S. Appl. No. 14/273,866 dated Mar. 25, 2015.
Office Action issued by the United States Patent and Trademark Office for U.S. Appl. No. 14/517,114 dated Apr. 6, 2015.

* cited by examiner

SYSTEM AND METHOD FOR COOPERATIVE SCHEDULING FOR CO-LOCATED ACCESS POINTS

CROSS REFERENCE TO RELATED APPLICATIONS

This application claims the benefit of prior U.S. Provisional Application Ser. No. 61/877,142 filed 12 Sep. 2013, which is incorporated herein by reference in its entirety.

FIELD OF THE INVENTION

The present invention relates generally to the field of WiFi; the 802.11a, b, g, n, ac standards; antenna arrays; sidelobe reduction; receivers; transmitters; beamforming; digital signal processing "DSP"; digital filtering; analog and digital signal cancellation and interference mitigation.

BACKGROUND OF THE INVENTION

Prior to setting forth a short discussion of the related art, it may be helpful to set forth definitions of certain terms that will be used hereinafter. Many of these terms are defined in the 802.11 specification but it should be appreciated that the invention is not limited to systems and methods complying with the 802.11 specification.

The term "AP" is an acronym for Access Point(s) and is used herein to define a wireless fidelity "WiFi" or other wireless station that is an attachment point for user equipment "UE".

The term "co-located" is used in herein to describe access points and refers to access points that are situated at the same general location, such as is the case with a multi-beam access point system, or to access points whose beams are sufficiently close or overlapping that one station is able to receive transmitted data from both or all of them. Access points may be implemented in software and therefore it is possible for multiple access points to be located at the same computing device which is running software to implement multiple access points.

The term "UE" is an acronym for User Equipment(s) and is used herein to define the station, e.g. WiFi station (STA) that attaches to an AP.

The term Station is a term used for any device which is a participant on the network, for example as used in the 802.11 specification. Both UEs and APs are considered in this context to be "Stations".

Distributed Inter-Frame Space "DIFS" and Short Inter-Frame Space "SIFS" are types of Inter-Frame Space as defined in the 802.11 specifications.

The term MBAP is an acronym for MultiBeam Access Point and is usually used in the context of a MBAP system. This is an AP system that includes multiple APs which may operate simultaneously on the same radio channel where directive beams and other technology enable co-location of APs.

The term "beamformer" as used herein refers to analog and/or digital circuitry that implements beamforming and may include combiners and phase shifters or delays and in some cases amplifiers and/or attenuators to adjust the weights of signals to or from each antenna in an antenna array. Digital beamformers may be implemented in digital circuitry such as a digital signal processor (DSP), field-programmable gate array (FPGA), microprocessor or the central processing unit "CPU" of a computer to set the weights as may be expressed by phases and/or amplitudes of the above signals. Various techniques are used to implement beamforming including: Butler matrices, Blass Matrices and Rotman Lenses. In general, most approaches attempt to provide simultaneous coverage within a sector using multiple beams.

The term "cell" is used herein to refer to the area or region covered by a beam corresponding to an access point.

The specific Carrier Sense Multiple Access/Channel Assessment "CSMA/CA" mechanism used in the 802.11 media access code "MAC" is referred to as the distributed coordination function (DCF). A station that wishes to transmit first performs a clear channel assessment (CCA) by sensing the medium for a fixed duration, the DCF inter-frame space (DIFS).

The term Clear Channel Assessment (CCA) as used herein refers to a CCA function for example as defined in the 802.11 specifications;

The term Base Band Processor (BBP) as used herein may refer to encoding data and decoding data, for example so as to create the required WiFi baseband signal for any versions of the 802.11 protocol(s).

The term enhanced distributed channel access (EDCA) may refer for example to an extension of the basic DCF introduced in the 802.11e amendment to support prioritized quality of service (QoS). The EDCA mechanism defines four access categories (ACs).

The term AC is an acronym for access category as used herein may refer to AC as defined in the 802.11 specifications. Each AC may have specific values of access parameters, e.g., contention window minimum or maximum "CWmin", or "CWmax", Arbitration Inter-Frame Space Number "AIFSN" and transmission opportunity "TXOP" limit.

The term CW is an acronym for Contention window for example as defined in the 802.11 specifications. In the specifications a random backoff count is selected from the range [0, CW], where CW is typically equal to CWmin.

The term AIFS is an acronym for arbitration inter-frame space, for example as defined in the 802.11 specifications.

The term Transmit opportunity (TXOP) is a bounded period during which a station may transfer data of particular traffic, for example as defined in the 802.11 specifications.

WiFi has been implemented with a limited amount of frequency resources that use techniques of collision avoidance to allow multiple user equipments (UEs) to share the same channel. As the numbers of UEs proliferate, the impact of such a scheme restricts the ability of co-located Wi-Fi access points (APs) to support an ever increasing number of users.

BRIEF SUMMARY OF EMBODIMENTS OF THE INVENTION

In order to provide continuous coverage throughout a sector, the coverage of adjacent beams of a multi-beam antenna must overlap. This presents a potential for interference when adjacent beams illuminate the same area on the same frequency. Using different channels for adjacent beams may be used such that frequency selectivity reduces the interference from one subsector beam to another with the same frequency being used on alternate beams, designed so as to achieve a high level of isolation between co-located APs that operate on the same radio channel.

MBAPs are designed with directive antennas such that the same radio channel can be used simultaneously on different directional beams from the same physical location. With proper antenna beam control, UEs located at different directions from a MBAP can simultaneously receive transmissions, provided that the related e.g. 802.11 protocol(s) allow(s) transmission. However, a UE identified as at cell-edge may receive strong interference signals from co-located, non-associated APs through non-line-of-sight (NLOS), multi-path propagation and/or reflection that results in poor SNR from AP associated with that UE.

Some embodiments of the present invention include a method of scheduling data for transmission from a first access point "AP" to a station in a system of multiple co-located APs. Embodiments may comprise determining whether the station is also able to receive transmitted data from an AP of the multiple co-located APs other than the first AP. If said determining is positive, the data is transmitted only after ascertaining or determining that exclusive permission to transmit the data to the station has been granted to the first AP. Thus the method may comprise refraining from transmitting the data until it has been ascertained or determined that the first AP has been granted exclusive permission to transmit the data. The method may be performed at the first AP.

In embodiments of the invention the system of multiple co-located APs may be such that one or more stations are able to receive transmitted data from more than one of the co-located APs. This may be, for example, because the beams of some APs overlap, for example at cell edges, or because of factors outside the influence of the beams such as the presence of one or more reflectors in the operating environment. Other factors may result in one or more stations being able to receive transmitted data from more than one of the co-located APs.

Other embodiments this invention include a method of scheduling data for transmission from a first access point "AP" to a station in a system of multiple co-located APs. Embodiments may include determining whether the station is able to receive transmitted data from an AP of the multiple co-located APs other than the first AP, and if said determining is negative, ascertaining or determining whether any other co-located AP of the multiple co-located APs other than the first AP operating on the same channel has exclusive permission to transmit data to a station that is able to receive data from the first AP and the other co-located AP, and if another AP has said exclusive permission, performing one or more of the following operations prior to transmitting the data to the station: waiting until the other AP no longer has the exclusive permission, lowering transmit power, adjusting one or more transmission beams to reduce the signal interference of the AP on the station.

Other embodiments include an access point which according to embodiments of the invention may be configured to implement any of the methods described herein. According to embodiments of the invention the AP may comprise a receiver, a transmitter and one or more processors configured to receive data for transmission to a station in the network, determine whether the station is also able to receive transmitted data from another of the multiple co-located APs, and if said determining is positive, withhold transmission of the data unless exclusive permission to transmit the data to the station has been granted to the AP.

Some embodiments this invention include a method to identify cell-edge UEs contaminated by neighboring beams and to schedule AP transmissions to cell-edge UEs cooperatively between two co-located APs by using a token. This is referred to in the following as Cell-Edge Cooperative Scheduling. When the token is obtain by the first AP while transmitting data to a cell-edge UE, the other AP may be not allowed to transmit or required to lower transmission power to prevent or reduce interference to the cell-edge UEs.

BRIEF DESCRIPTION OF THE DRAWINGS

For a better understanding of the invention, and in order to show how it may be implemented, references are made, purely by way of example, to the accompanying drawings in which like numerals designate corresponding elements or sections.

Figure 1:
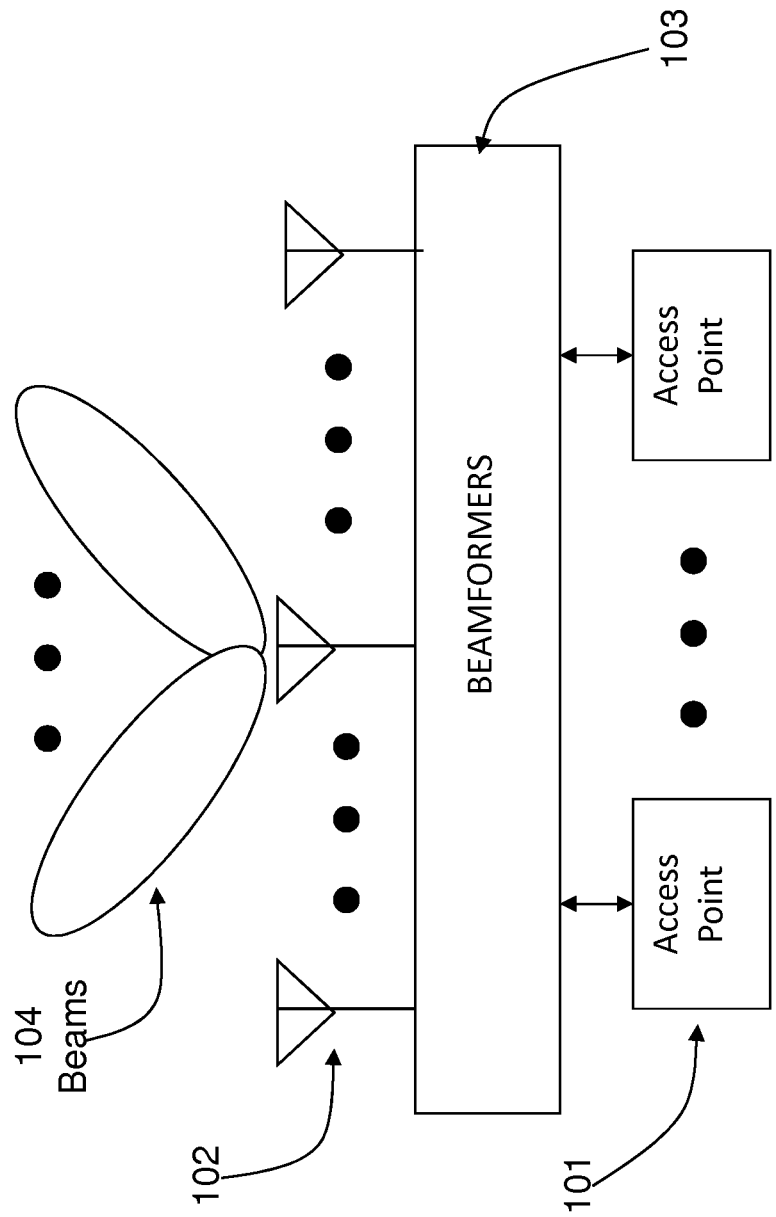
FIG. 1 illustrates a MultiBeam Access Point (MBAP) system including multiple APs operating simultaneously on the same radio channel where directive beams and other technology enable co-location of APs, according to an embodiment of the invention.

The drawings together with the following detailed description are designed make the embodiments of the invention apparent to those skilled in the art.

DETAILED DESCRIPTION OF EMBODIMENTS OF THE INVENTION

It is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

An example of a station that is able to receive transmitted data from another of the multiple co-located APs is one that is located at the edge of one cell adjacent to another cell. Another example is a station that is receiving signals from an AP outside the subsector in which the station is located, for example due to reflection. The method may be performed at the AP.

A list of UEs which are categorized as being able to receive data from co-located APs may be consulted or reviewed to perform the determination. This list may be held at memory in a first AP or correspond to a first AP. The list may then include stations categorized as being able also to receive data from at least one AP of the multiple co-located APs other than the first AP. An embodiment of the invention may include the creation or compilation of the list. An embodiment of the invention may include categorizing one or more stations that are able to receive data from multiple co-located APs. The categorization may be based on radio measurements, e.g. reported from stations for the respective APs.

An AP that has been granted exclusive permission to transmit the data is one that is permitted or able to transmit the data to the exclusion of any other AP that might have received data intended for the same station. The grant of the exclusive permission may take any form including but not limited to the issue of a token whereby only an AP with a token can transmit data to the station, or the issue of an instruction to the AP to transmit the data.

If the determination is negative the data may be transmitted to the station. The method may include a check to determine whether the AP has been granted exclusive permission to transmit the data and if the permission has not been granted the data may be moved to a queue to be transmitted at a later time. The data in the queue may be given higher priority than other data to be transmitted to the station to minimize any delay in it arriving or to reduce the likelihood that it arrives out of chronological order.

In some embodiments of the invention even if the station does not require exclusive permission to transmit to it, nevertheless before data is transmitted to it a check may be made to ascertain whether the transmission would interfere with transmission by another co-located AP. For example there may be another AP that is transmitting data to another station that is able to receive data from the current AP and another AP. If this is found and the other AP has exclusive permission for the transmission, the current AP may wait for the permission to be revoked, e.g. by a controller, or relinquished by the AP, or lower its transmit power or adjust its transmission beams e.g. to reduce any interference to the other station.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting. In the description that follows, the interaction of two APs and antenna beams is described in detail. The use of two APs and beams is simply to reduce the complexity of the description and associated Figures. Embodiments of the invention are applicable to an MBAP with N beams and M arrays, where the arrays may be physically stacked so as to produce uncorrelated antennas e.g. for MIMO systems.

Embodiments of this invention include apparatus and methods to allow the reuse of frequency resources by implementing AP clusters using multi-beam antennas breaking down a sector area of coverage into smaller subsectors. In order to accomplish this, several limitations of multi-beam antennas may be addressed. First, since WiFi is a time division duplex system (TDD), the transmitting and receiving functions use the same channel. Unsynchronized operation between APs means a transmitting AP's signal may interfere with the reception of another AP that uses the same channel unless sufficient isolation is provided between the transmitting and receiving functions.

Two APs transmitting at or on the same channel may also interfere with each other's associated UEs. A UE at cell-edge may receive strong interference from a co-located, non-associated AP resulting in poor SNR from its associated AP. Embodiments of the invention provide a method whereby the adverse effects of this interference can be suppressed through a technique of cooperatively scheduling co-located APs transmission to cell-edge stations.

In the following description of embodiments of the invention the cell edge stations are UEs. However embodiments of the invention are not limited to UEs at cell edges and are also applicable to other stations which are at cell edges for any reason.

FIG. 1 illustrates how a number of access points 101 may direct a beamformer 103 and antenna array 102 to create a number of beams 104 to form a multi-beam access point system according to embodiments of the present invention.

More specifically, FIG. 1 shows for the purpose of explanation multiple access points (APs) 101 associated with an array, also known as a matrix, of beamformers 103 and antennas 102. The beamformers 103 each include circuitry and/or software controlling one or more of antennas 102 to create a number of beams 104. Each "beam" defines the directivity of the antenna for transmission and reception of signals and thus defines a distinct spatial region. The combination of access points 101, beamformers 103 and antennas 102 forms a multi-beam access point system, which may operate using phased array technology. In embodiments of the invention each beam is created by one or more of the antennas. For each beam to be created by multiple antennas there may be more antennas than beams. There may be a one-to-one correspondence between APs and beams.

Figure 2:
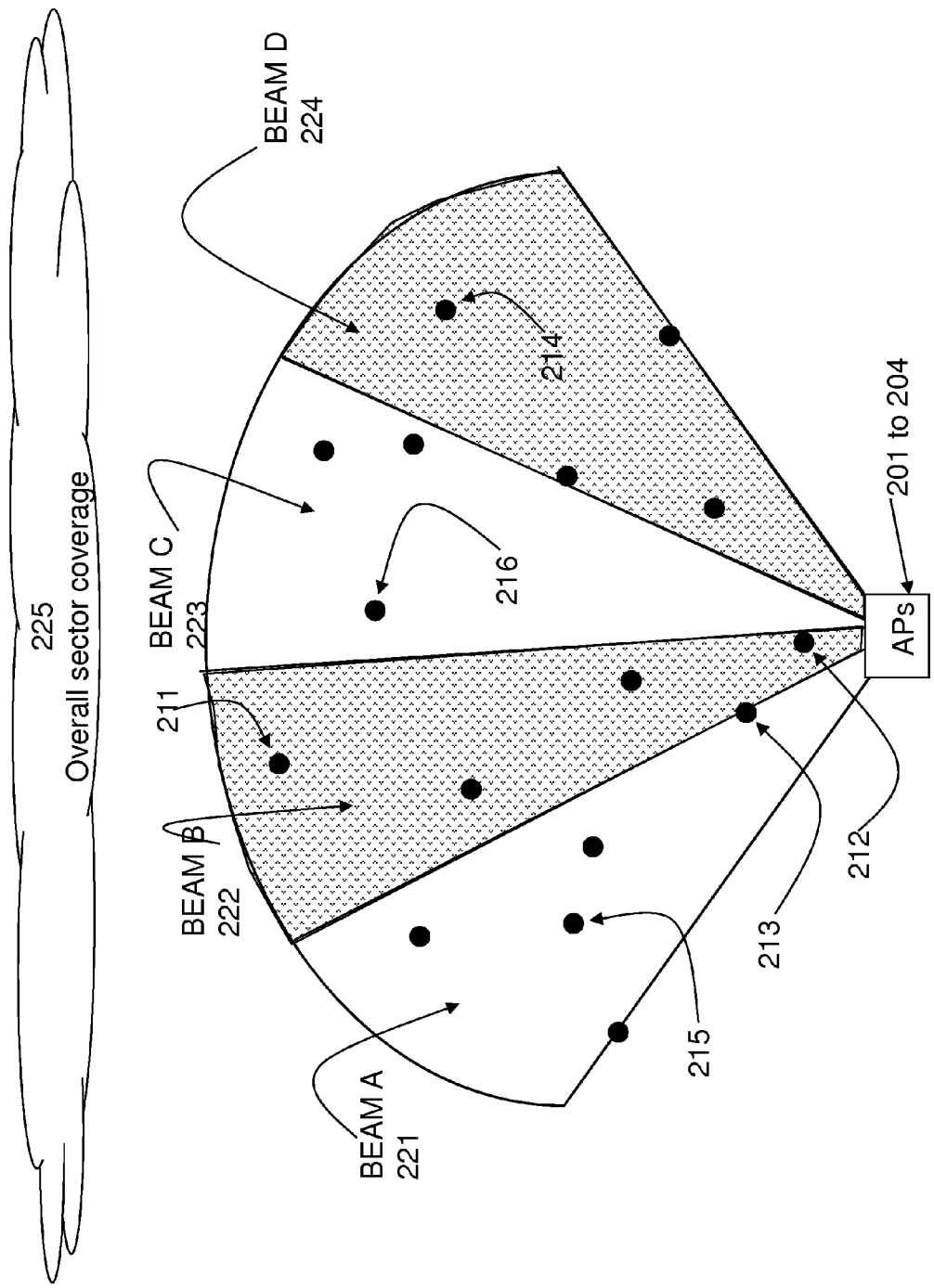
FIG. 2 shows a sector coverage area subdivided into four subsectors according to an embodiment of the invention.

FIG. 2 shows a sector coverage area 225 subdivided into four subsectors 221 to 224 with corresponding beams A, B, C, D to provide communications for access points 201 to 204 to the UEs 211 through 216 according to an embodiment of the present invention. The APs are at the same physical location, i.e. co-located. Co-located APs are sometime referred to as a cluster, or cluster APs. The subsectors shown in FIG. 2 are shown as contiguous areas but in practice, as will be appreciated by those skilled in the art, in order to achieve contiguous coverage in practice the beams corresponding to the respective sectors overlap. The areas or regions (since coverage is three dimensional) covered by respective beams are referred to as cells.

Figure 3:
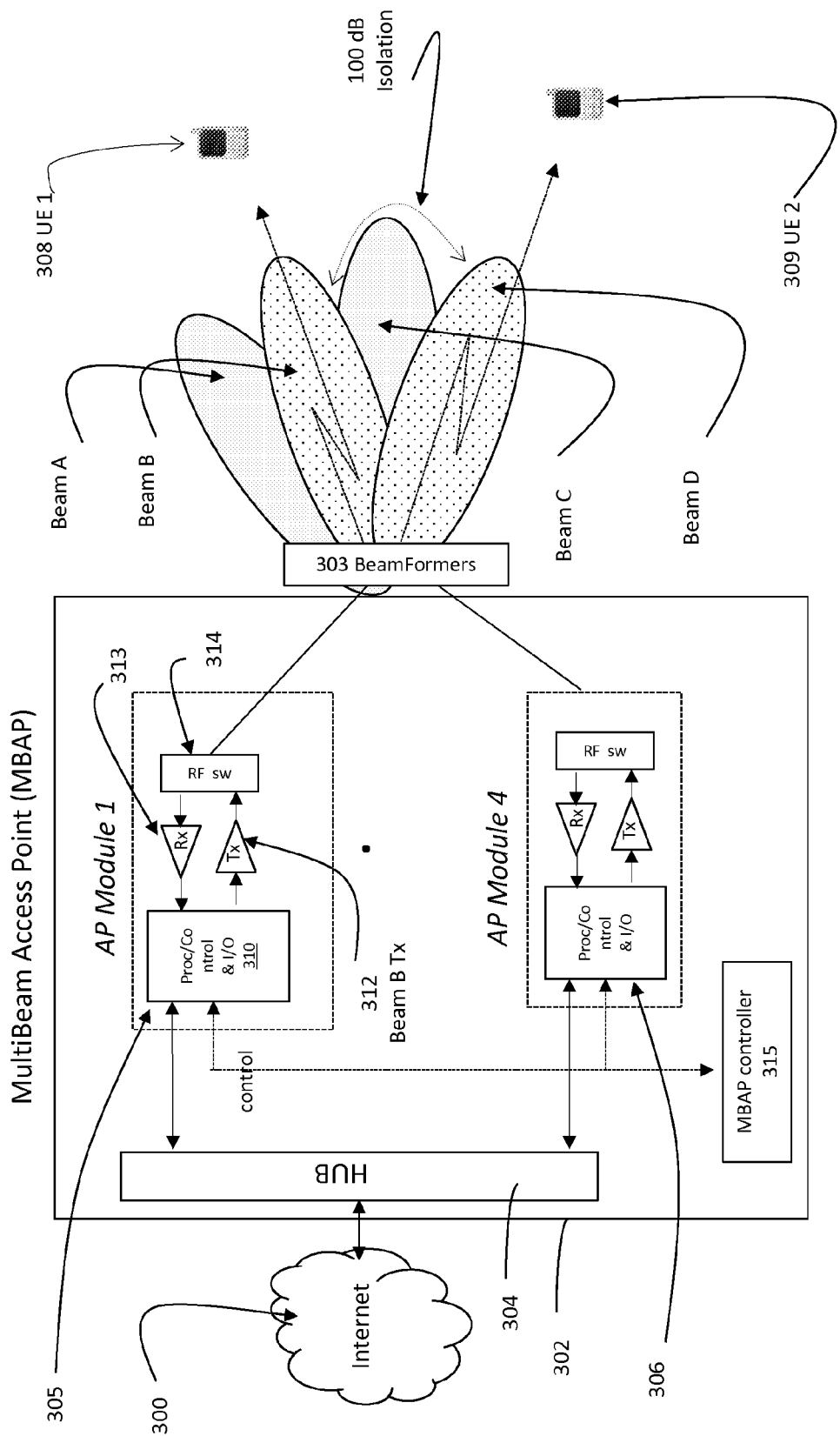
FIG. 3 illustrates a block diagram of a MBAP configuration with four AP modules according to an embodiment of the invention.

FIG. 3 shows a block diagram illustrating AP modules that may be integrated within a MBAP configuration according to embodiments of the present invention. In some embodiments of the invention, as shown in FIG. 3, the MBAP system may act as an interface between the internet 300 and UEs 308 and 309. The MBAP is shown as comprising AP array 302 and beamformer matrix 303. The AP array 302 comprises hub 304 which may receive and transmit communications to and from a connection, e.g. a wired connection, to the internet 300. The hub 304 may include a bus enabling communication between APs and between APs and controller 315. Between the hub 304 and the beamformer matrix 303 are a number of access point modules.

Figure 3A:
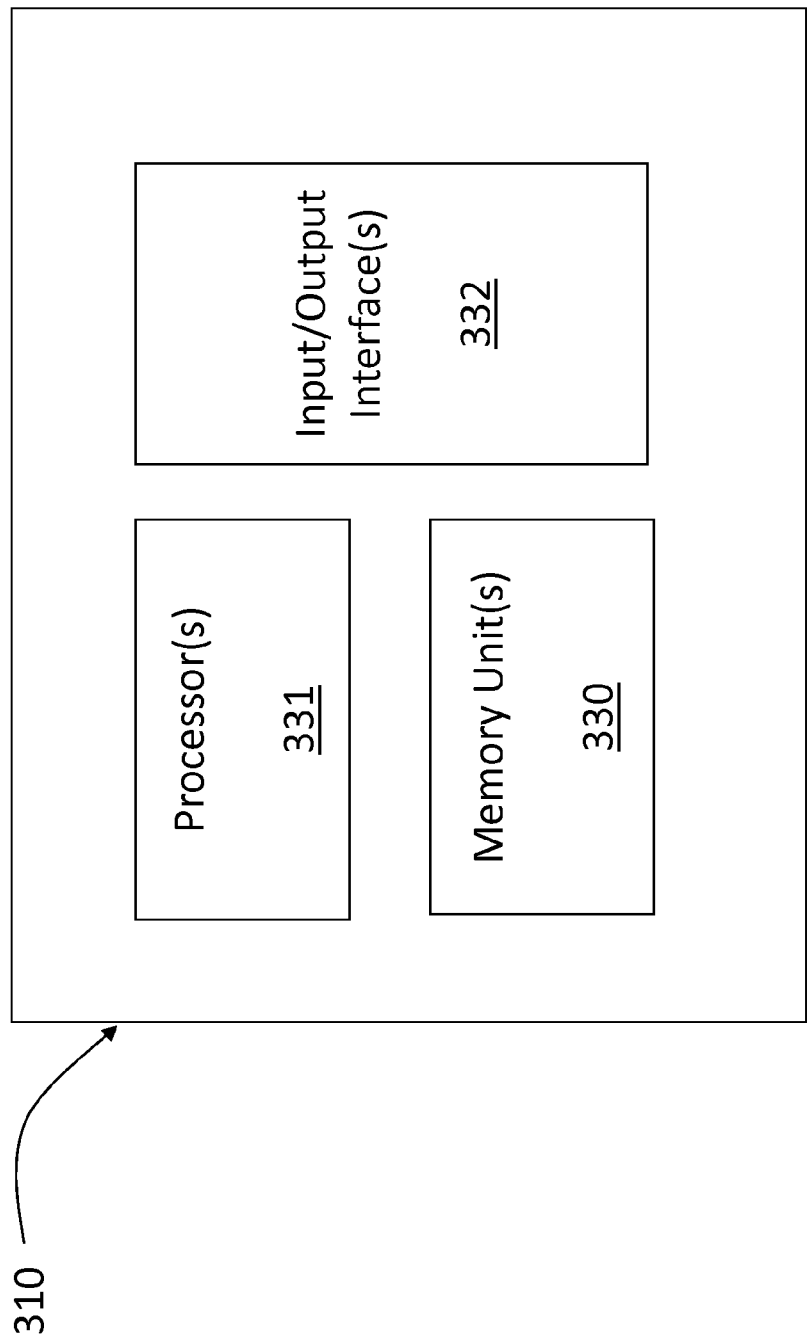
FIG. 3(a) shows in more detail some of the functional components of an AP module.

In this embodiment four AP modules are provided of which only two are shown for the sake of clarity, numbered 305 and 306. The AP modules supply signals to beamformer 303, which creates multiple directive antenna beams. In FIG. 3 are shown beam A, beam B, beam C and Beam D. The beams overlap in order to provide contiguous coverage over a sector. AP module 305 corresponding to beam B is shown to comprise in this embodiment a processing and control module 310 shown in more detail in FIG. 3(a). AP module 305 further comprises beam B transmit amplifier 312, beam B receive amplifier 313 and radio frequency switch 314 for switching between transmit and receive modes. AP module 306 comprises similar components not labeled for controlling beam D.

In this embodiment, all of the AP modules are operated under the control of a MBAP controller 315.

In this embodiment, beams A and C operate on one channel and beams B and D operate on another, non-overlapping channel, as noted by their two types of shading. In the figure, beam B is shown communicating to UE1 308 while beam D is shown communicating to UE2 309.

FIG. 3(*a*) shows some components of processing and control module 310 according to embodiments of the present invention. Control module 310 may include one or more controller(s) or processor(s) 331 for executing operations and one or more memory unit(s) 330 for storing data and/or instructions (e.g., software) executable by a processor. The data may include a list of cell-edge stations as described further herein. Processor(s) 331 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 330 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units. Processors and controllers such as processor 331 and other processors and controllers described herein may be general purpose processors configured to perform embodiments of the invention by for example executing code or software stored in memory, or may be other processors, e.g. dedicated processors. The control module 310 may further comprise input/output interface(s) 332 circuitry as is known in the art.

Figure 4:
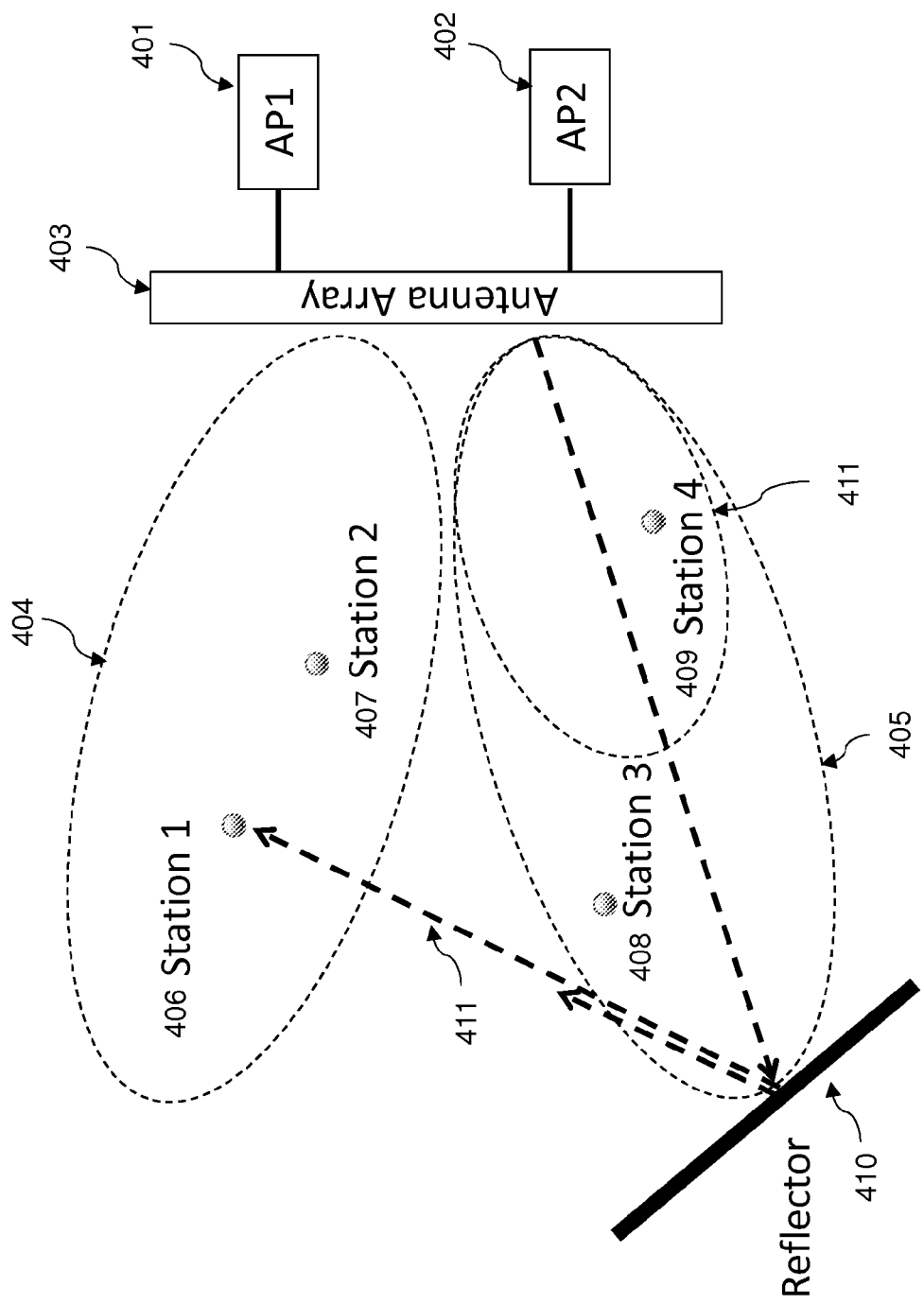
FIG. 4 shows an example of Multi-Beam co-located APs according to an embodiment of the invention where Station 1 served by AP1 is contaminated by AP2's signal in a neighboring beam through multi-path propagation and a reflector.

FIG. 4 shows an example, according to some embodiments, of two beams 404 and 405 created by antenna array 403 connected to two co-located APs 401 and 402 where Station 1 406 and Station 2 407 are associated with AP1 401, Station 3 408 and Station 4 409 are associated with AP2 402. Station 1 406 is contaminated by AP2's signal 411 through reflector 410. Multi-path propagation due to other causes not shown may also cause station 1 406 to be contaminated by the signal from AP2. The smaller oval 411 in FIG. 4 shows a reduced size beam that might result from a reduction of power of beam 405, which would avoid this contamination.

Figure 5:
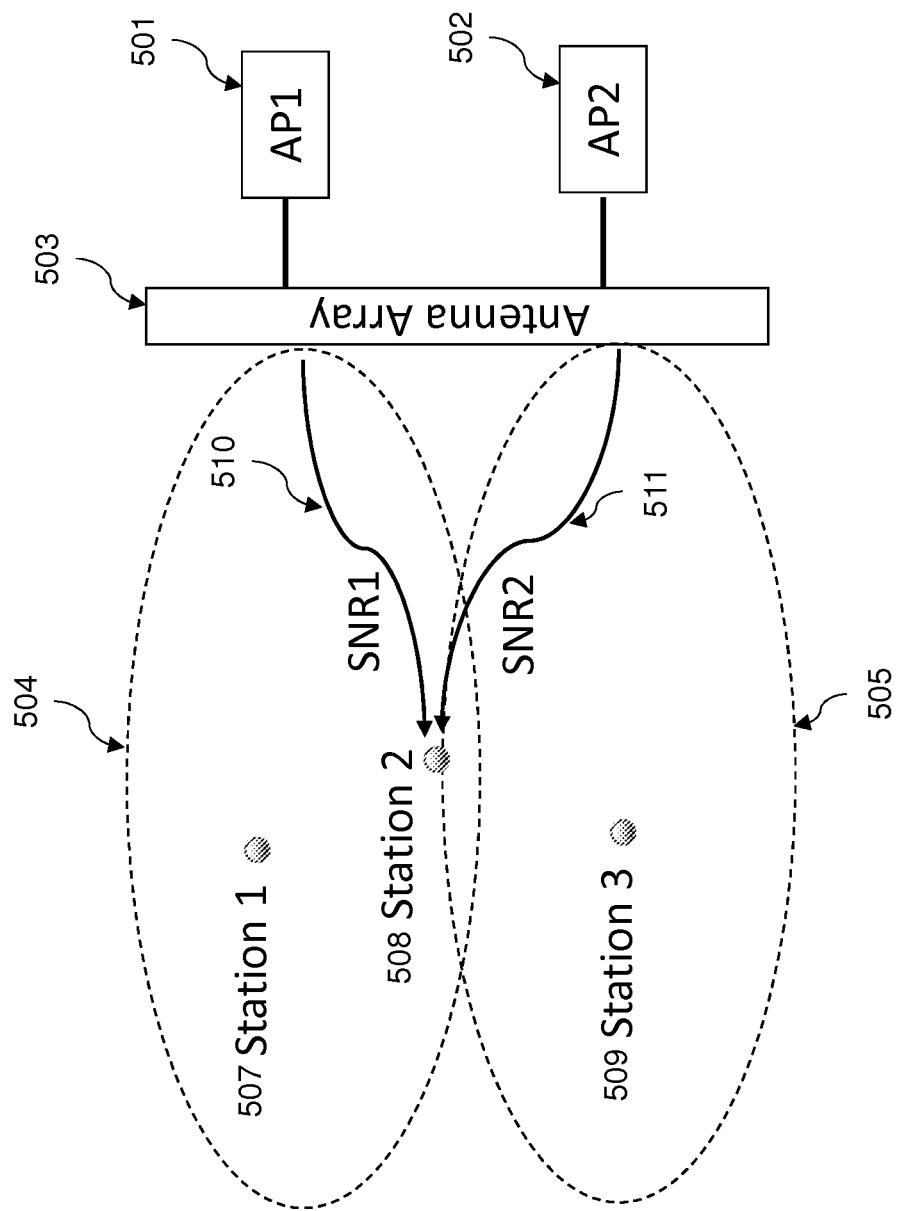
FIG. 5 shows two co-located, co-channel APs according to an embodiment of the invention serving three Stations, Station 1, Station 2 served by AP1 and Station 3 served by AP2; it can be seen that Station 2 is contaminated by AP2's beam and detected as at cell-edge.

FIG. 5 shows, according to some embodiments, two co-located, co-channel APs serving three Stations, Station 1 507, Station 2 508 served by AP1 501 and Station 3 509 served by AP2 502; it can be seen that Station 2 508 receives signal 510 of signal to noise ratio "SNR" SNR1 from AP1 and is contaminated by AP2's signal 511 of SNR2 at cell-edge where the beams overlap. The signals received by a station may be examined according to certain criteria to determine whether it is at a cell-edge. Part of the examination may be done by the station itself, e.g. as part of its radio measurement report. For example in some embodiments of the invention a cell-edge station may be defined as one for which $SNR_{servingAP}<Threshold1$ and $SNR_{interfereAP}/SNR_{servingAP}>Threshold2$. In this case, Station 2 508 would be detected as cell-edge station when $SNR_1<Threshold1$ and $SNR_2/SNR_1>Threshold2$. The first threshold is a preliminary indication that a station may be a cell edge station and the second threshold is used to confirm that the low SNR is the result of interference from another AP. It will be appreciated that in the foregoing calculations SNR may be replaced by signal to noise plus interference ratio "SNIR". It will also be appreciated that according to the foregoing a station that is not in fact at a cell edge but nevertheless is subject to interference from another AP, such as station 406 in FIG. 4, may also be determined to be at a cell-edge. All such stations are referred to in the following as "cell-edge" stations and thus references to cell-edge stations should be taken to include stations that are not physically at a cell edge but nevertheless satisfy criteria for determining what is referred to as a "cell-edge" station. A station may be determined to be a cell-edge station if it is able to receive data from more than one of a set of co-located APs.

Figure 6:
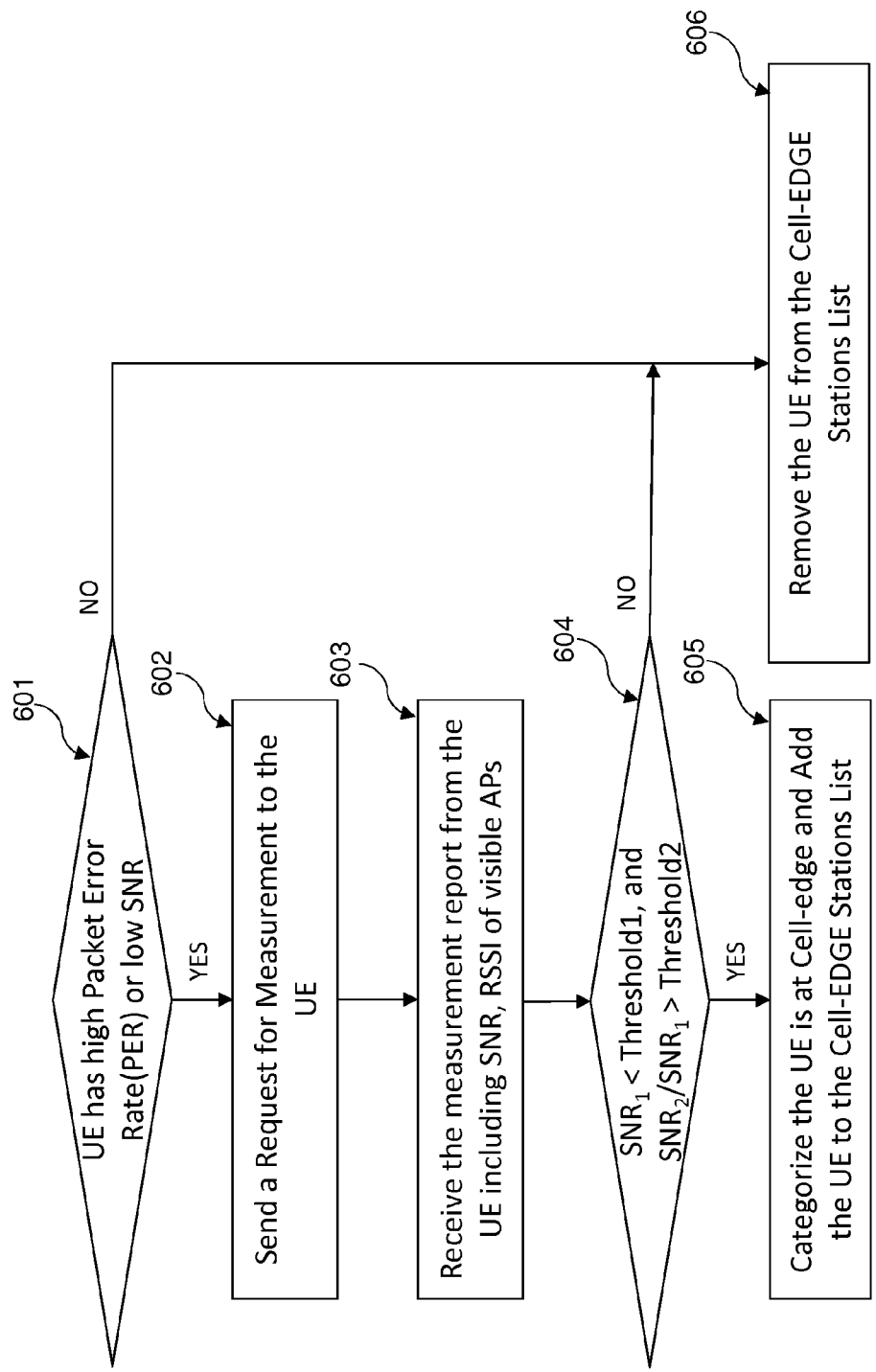
FIG. 6 illustrates a flow chart for a possible method of an AP categorizing a UE as at cell-edge according to an embodiment of the invention.

FIG. 6 shows a flow chart for a possible method of categorizing a cell-edge UE by an AP according to an embodiment of the invention. The method may be performed for example at an AP on a per UE basis. The operations of FIG. 6 may take place at an AP and specifically may be performed within the combined processor and intermediate frequency controller e.g. item 310 of AP 305 in FIG. 3, or with other equipment. In operation 601, the AP monitors a UE to determine whether it has a high packet error rate (PER) e.g. larger than a particular threshold, low SNR (less than a threshold e.g. 10 dB) or low RSSI (e.g. less than a threshold e.g. −74 dBm). If none of these criteria are met, e.g. the result of the determination at operation 601 is negative, the UE will be removed from a Cell-Edge Stations List (if it was already on it) at operation 606. This list may be held or stored for example at one or more of the memory units 330 shown in FIG. 3(*a*). If any of these criteria are met, e.g. the result of the determination at operation 601 is positive, the AP sends a Request for Measurement to the UE at operation 602. Next, AP receives the measurement report from the station including SNR and RSSI of visible APs at operation 603. "Visible" in this context means APs from which the station is receiving signals of any kind. The visible APs will include the AP that sent the request plus any sources of interference. In operation 604, the AP categorizes a station as a cell-edge Station based on SNRs from its associated AP ($SNR_1$) and the strongest AP among others ($SNR_2$). The strongest AP among others may be the AP from which the station receives the strongest signal. Thus at operation 604 it is determined whether $SNR_1<Threshold1$ and $SNR_2/SNR_1>Threshold2$. If the result of the determination is positive, the UE will be added to a Cell-Edge Stations List at operation 605. According to some embodiments of the invention, the list includes the identities of all stations determined to be Cell-Edge stations and for each Cell-Edge station the identity of the other AP from which the station receives the strongest signal. Other information may be included in the list. Otherwise, e.g. if the result of the determination at operation 604 is negative, the UE will be removed from the Cell-Edge Stations List (if it was already on it) at operation 606.

In some embodiments of the invention, only one of two APs may transmit to an associated cell-edge station. Thus for a station that is able to receive transmitted data from more than one of co-located APs, an AP will transmit data only if it has exclusive permission to transmit the data. The exclusive permission may be controlled by requiring one AP to obtain a token, in a manner to be described further below. The other AP may be silent, e.g. until the other AP no longer has the exclusive permission, or the AP may lower transmit power if necessary. Each AP may maintain a list of its cell-edge stations which may be shared with a co-located AP or neighboring AP for channel estimation, lowering transmit power to reduce interference, or otherwise attempting to reduce interference.

Figure 7:
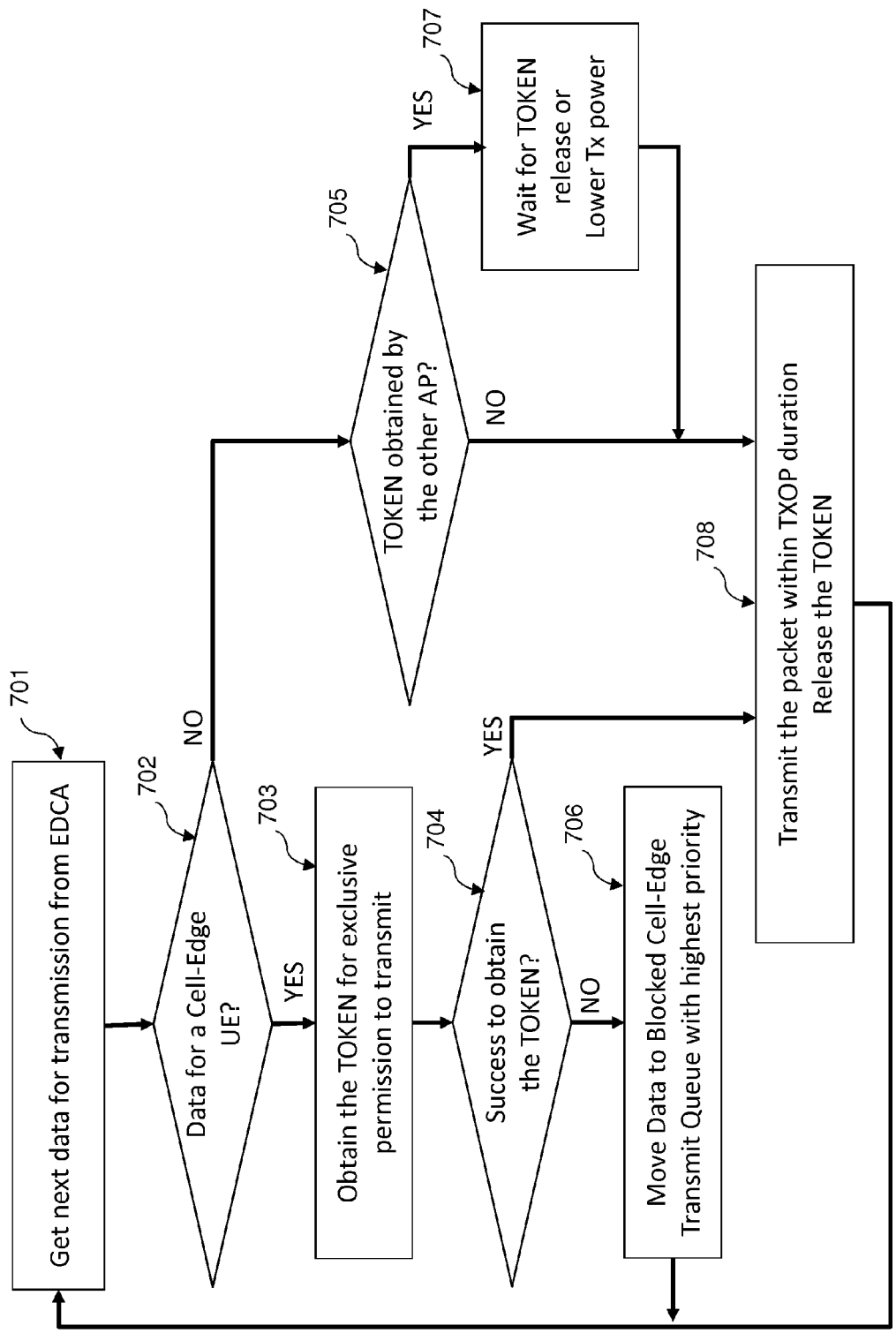
FIG. 7 shows a flow chart for a possible of Cell-Edge Station Cooperative Scheduling according to an embodiment of the invention.

FIG. 7 illustrates a flow chart of a possible method of Cell-Edge Station Cooperative Scheduling according to an embodiment of the invention using a token for permission to transmit data according to an embodiment. The operations of FIG. 7 may take place for example at an AP and specifically may be performed within for example the processing and control module of the AP such as module 310 of AP 305 in FIG. 3. For simplicity the flow of FIG. 7 uses an example of two co-located APs but it will be appreciated that it can be scaled up for more than two co-located interfering APs.

Initially, at operation 701 an AP receives the next Data for transmission from the EDCA. The data may have any Access Category. For the purpose of this embodiment of the invention a new AC which may be termed a Blocked Cell-Edge Access Category (AC_BK-CELL-EDGE) may be used. The AP checks if the data is destined for a cell-edge UE at operation 702. This may be done by determining whether the station is also able to receive transmitted data from another of the multiple co-located APs. This may be done for example by consulting or analyzing the list compiled or created according to for example the flow shown in FIG. 6. Alternatively the calculations to determine whether the station is a cell-edge station, i.e. able to receive transmitted data from this and another co-located AP, may be performed at this stage of the flow. If the determination or check is positive and the data is for a cell-edge UE, the AP will try to obtain exclusive permission to transmit to that UE in the form of a token. This attempt is made at operation 703 in FIG. 7. The token may be obtained from the controller 315.

In one embodiment of the invention the controller 315 has available one token per pair or set of co-channel APs. Each AP may have its own list of cell-edge stations. Thus, for example in the arrangement shown in FIG. 2, one token may be available, e.g. from the controller 315 for one of the APs corresponding to beams A and C and one token may be available for one of the APs corresponding to beams B and D. This arrangement may be scaled up for MBAP systems with more beams and APs. Thus according to some embodiments of the invention more than two co-channel APs may share the same token. In a system with more than two co-channel APs, different tokens may be allocated to different groups or pairs of APs capable of transmitting signals to the same station. These different groups or pairs of APs may include co-channel APs with adjacent or overlapping beams or co-channel APs otherwise capable of transmitting signals to the same station.

It will be appreciated that two APs, or in some instances more than two APs, may seek a token for their cell-edge stations in which case it may be given to the first requester. However a token may be valid only for the duration of the transmit window TXOP which helps to ensure fairness between APs. The flow then proceeds to operation 704. In operation 704, the AP determines if it has been successful in obtaining the token. If the determination is positive and the AP has the token the flow proceeds to operation 708 where it transmits the Data for TXOP duration and then releases the token. The "release" of a token may take the form of a change in a value in a register or memory location. The TXOP duration is configurable and may permit multiple data packets to be transmitted within the TXOP duration.

If the AP has failed to obtain the token as determined by decision 704, e.g. the result of the determination at operation 703 is negative, transmission of the data is withheld. Thus at operation 706 the data is moved to Blocked Cell-Edge Access Category whereby it is placed in a transmit queue with highest priority. If the determination at operation 702 is negative and the data is not for a cell-edge UE, no token is required.

Thus it will be seen that according to some embodiments of the invention, data intended for a station that is able to receive transmitted data from more than one co-located AP is only transmitted after ascertaining that exclusive permission to transmit the data to the station, e.g. in the form of the token, has been granted to the AP. According to some embodiments of the invention, before data is transmitted to a station that is able to receive transmitted data from more than one co-located AP, it is determined that the AP has exclusive permission to transmit data to the station. This determination may not be necessary in the case of data bound for stations that are not able to receive transmitted data from more than one station, e.g. a negative determination at operation 702.

Nevertheless the AP will check to determine or ascertain whether a token has been obtained by the other AP for another UE at the cell edge at decision 705. AP will go ahead to operation 708 to transmit the Data if the other co-located AP does not hold the token, e.g. the result of the determination at operation 705 is negative. At this stage the data is forwarded to the transmitter at the AP, e.g. transmitter 312 in FIG. 3 and transmitted to a cell-edge UE.

If the result of the determination at operation 705 is positive, which may be for example because the other co-located AP holds the token and is transmitting to a cell-edge UE, at stage 707 of the flow AP may perform for example one or more of the following operations before transmitting the data (other operations may be performed): wait for the token to be released or waiting for the exclusive permission to be revoked, lower its transmit power, adjust its transmission beams to reduce its signal interference on the other AP's cell-edge UE.

The purpose of the one or more operations at stage 707 may be to ensure that the AP does not transmit to a non cell-edge UE and thereby possibly interfere with the other AP transmitting to a cell edge UE. The APs communicate with each other and/or the controller via the bus within hub 304 in order to determine which APs have tokens.

Figure 8:
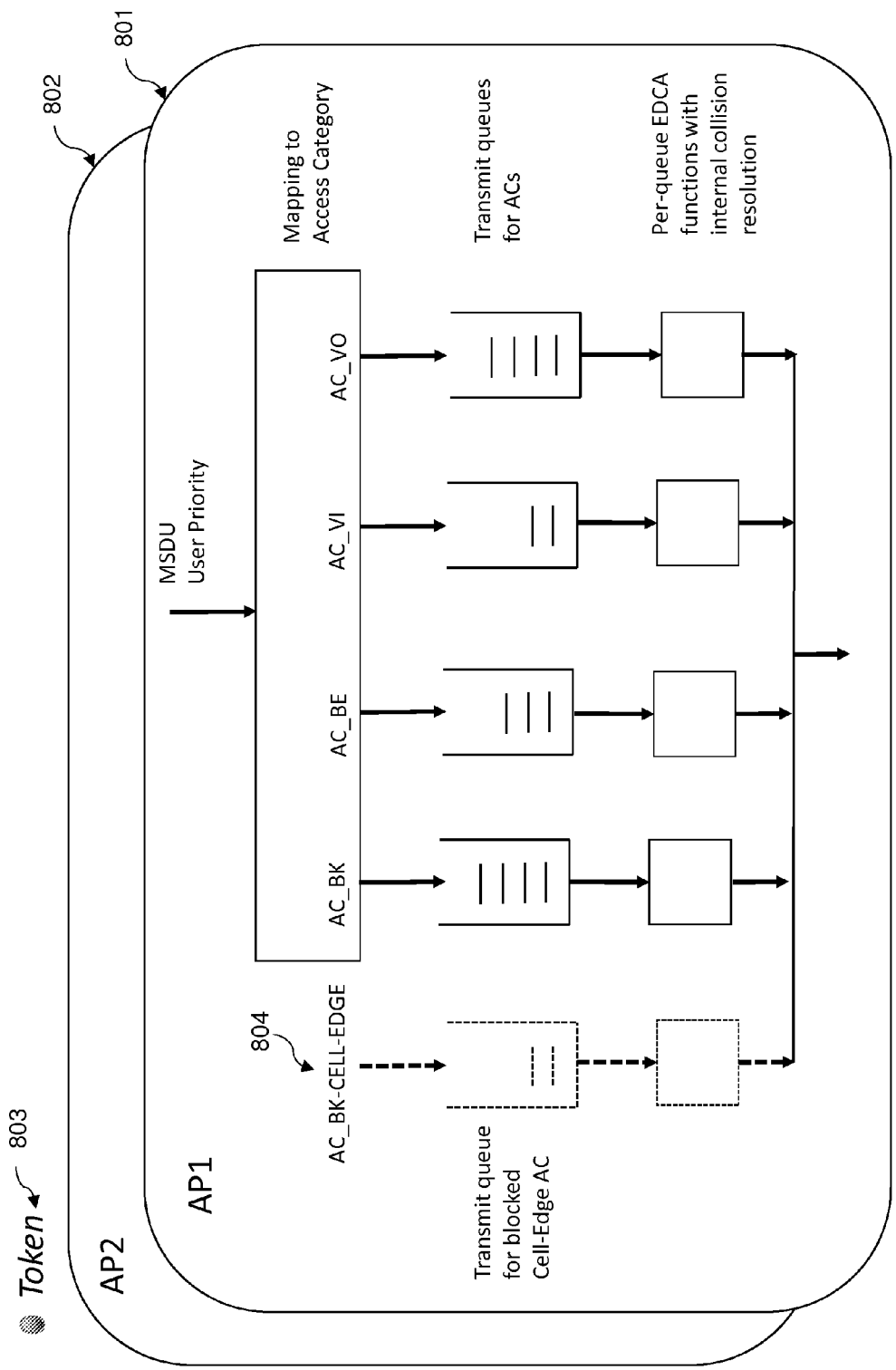
FIG. 8 shows a block diagram of co-located APs EDCA with blocked cell-edge AC and a token for cooperatively scheduling of transmission to cell-edge UEs according to an embodiment of the invention.

FIG. 8 shows a co-located APs scheduling block diagram showing scheduling that may be used in embodiments of the invention. The scheduling may be implemented in the one or more processors shown in FIG. 3(a) or on other suitable equipment. The diagram shows two instances of scheduler 801 and 802, one for each co-located AP, and a token 803. The token may take any form. For example it may simply be a flag set at one AP that is reported to other APs, optionally via controller 315. Use of a token is one possible method of ensuring exclusivity between APs. Other methods will be apparent to those skilled in the art.

In this embodiment an additional access category, termed here the Blocked Cell-Edge Access Category 804 (AC_BK-CELL-EDGE) is proposed to be added to access categories already in use, for example those used in a legacy Enhanced distributed channel access (EDCA) implementation. Data for a non-cell edge station may be scheduled in the same manner as in the legacy e.g. EDCA implementation. Data for cell-edge station in this embodiment will be put into AC_BK-CELL-EDGE queue, for example as shown in FIG. 7, operation 705, if an AP fails to obtain a token 803 for the data. This data with AC_BK-CELL-EDGE will have highest priority once AP obtains the token 803 and is then able to transmit the data. If two (or more) instance of the EDCA access function gain access simultaneously, the internal collision is resolved by the highest priority AC gaining access and the other AC behaving as if an external collision occurred by doubling its contention window and re-arming for another access attempt.

An AP will release a token once the data for the respective cell-edge station is transmitted within the transmit opportunity (TXOP) duration limit set for the data's original AC, i.e. the AC before the data was in the AC_BK-CELL-EDGE. An AP may further share the ID or MAC address of a cell-edge station to which it has transmitted data. For example this may be shared with a co-located AP and/or the controller 315, via the hub 304 for the purpose of channel estimation, lowering of transmit power or otherwise handling interference.

In embodiments of the invention, access to the token 803 may be controlled by a system of mutual exclusion that ensures only one process or operation can access the token 803 at one time. Thus for example if two APs initiate a process to gain access to or obtain the token, only the first process to reach the token will succeed. Mutual exclusion can be implemented in hardware or software or both, e.g., shared memory and an atomic test-and-set instruction. A process can test-and-set on a location in shared memory, and since the operation is atomic, only one process can set the flag at a time. Other mutual exclusion operations such as atomic operations can be used to provide mutual exclusion of data structures; one example of these is compare-and-swap (CAS). Beside hardware-supported solutions, some software solutions exist that use busy waiting to achieve mutual exclusion as well. The above mutual exclusion solutions can be used to build the synchronization primitives, e.g., Locks, Mutexes, Semaphores, Monitors, Message passing and Spinlock, etc.

The methods described for embodiments of this invention can be implemented in hardware, a combination of hardware and software or software only. A unique aspect of some embodiments is the possibility for implementation completely in software, for example by augmenting the notational algorithms of the 802.11xx protocol. Thus embodiments of the invention may take the form of one or more computer readable media, e.g. non-transitory computer readable media, which when implemented on one or more processors in a MBAP system cause the system or APs in the system to perform any of the methods described above.

The methods described herein are applicable to all versions of the 802.11 protocol, specially 802.11a, b, g, n and ac.

The figures that have been described detail how the transmitting and receiving apparatus(es) supporting two co-located AP interact with each other. As will be appreciated by one skilled in the art, these same techniques can be readily expanded when there are available multiple APs that may operate on the same channel, as may be present in the same MBAP.

As will be appreciated by someone skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." In one aspect the invention provides a computer readable medium comprising instructions which when implemented on one or more processors in a computing system causes the system to carry out any of the methods described above. The computer readable medium may be in non-transitory form.

The aforementioned block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method of scheduling data for transmission from a first access point (AP) to a station in a system of multiple co-located APs, the method comprising:
    determining whether the station is a cell edge station if, the station is able to receive transmitted data from said first AP and from at least one second AP of the multiple co-located APs other than the first AP, and
    the signal to noise ratio (SNR) or signal to noise plus interference ratio (SINR) of the first AP is less than a first threshold, and
    the ratio of signal to noise ratios (SNRs) or signal to interference plus noise ratios (SINRs) for the first AP and the second AP is less than a second threshold; and
    if said determining is positive, only transmitting the data by the first AP after ascertaining that the first AP has permission to transmit the data to the station, wherein the second AP is prevented from transmitting while said first AP has permission to transmit to the station.

2. The method of claim 1, wherein the determining comprises consulting a list of stations categorized as cell edge stations.

3. The method of claim 2, comprising compiling said list of stations categorized as cell edge stations based on said determining.

4. The method of claim 1, comprising, if said determination is negative, transmitting the data to the station from the first AP.

5. The method of claim 4, comprising:
    prior to transmitting the data to the station, ascertaining whether any other co-located AP of the multiple co-located APs operating on the same channel other than the first AP has exclusive permission to transmit data to another station that is able to receive data from the first AP and the other co-located AP; and
    only transmitting the data to the station if no other co-located AP of the multiple co-located APs operating on the same channel other than the first AP has said exclusive permission.

6. The method of claim 5, comprising:
    if another co-located AP has said exclusive permission, performing one or more of the following operations prior to transmitting the data to the station from the first AP:
        waiting for the exclusive permission to be revoked,
        lowering transmit power, and
        adjusting one or more transmission beams to reduce the signal interference of the first AP on the other station.

7. The method of claim 1, comprising:
    determining whether the first AP has been granted exclusive permission to transmit the data to the station; and
    if the permission has not been granted moving the data to a queue to be transmitted at a later time, and
    if the permission has been granted transmitting the data.

8. The method of claim 7, comprising scheduling the data in the queue to have higher priority than other data to be transmitted to the station.

9. The method of claim 1, wherein if said determining is positive, then further:
    receiving an exclusive permission token by the first AP prior to transmitting the data to the station; and
    relinquishing the exclusive permission token by the first AP after transmitting the data to the station.

10. A method of scheduling data for transmission from a first access point "AP" to a first station in a system of multiple co-located APs, the method comprising:
    determining whether the first station is able to receive transmitted data from the first AP and another of the multiple co-located APs other than the first AP; and if said determining is negative,
        ascertaining whether any other co-located AP of the multiple co-located APs operating on the same channel has exclusive permission to transmit data to a second station that is able to receive data from the first AP and the other co-located AP, and
        if the other co-located AP has said exclusive permission to transmit to said second station, performing one or more of the following operations prior to transmitting the data from the first AP to the first station:
            waiting until the other co-located AP no longer has the exclusive permission,
            lowering transmit power, and
            adjusting one or more transmission beams to reduce the signal interference of the first AP on the second station.

11. An access point (AP) for a wireless communication network comprising a system of multiple co-located APs, the AP comprising:
    a receiver for receiving signals from stations in the network;
    a transmitter for transmitting data to stations in the network; and
    one or more processors for processing data, wherein the one or more processors are configured to:
        receive data for transmission to a station in the network,
        determine whether the station is a cell edge station if:
            the station is able to receive transmitted data from said AP and from a second of the multiple co-located APs in the system of multiple co-located APs, and
            the signal to noise ratio (SNR) or signal to noise plus interference ratio (SINR) of the first AP is less than a first threshold, and
            the ratio of signal to noise ratios (SNRs) or signal to interference plus noise ratios (SINRs) for the first AP and the second AP is less than a second threshold; and
        if said determining is positive, withhold transmission of the data unless exclusive permission to transmit the data to the station has been granted to the AP.

12. An access point according to claim 11, further comprising a memory, wherein the one or more processors are further configured to compile a list to be stored in the memory of cell edge stations.

13. An access point according to claim 11, further comprising a scheduler, wherein the one or more processors are configured to move the data to a queue in the scheduler if exclusive permission to transmit the data to the station has not been granted.

14. An access point according to claim 11, wherein the one or more processors are further configured to allocate to data in the queue higher priority than other data to be transmitted to the station.

15. An access point according to claim 11, wherein the one or more processors are further configured to:
ascertain whether any other co-located AP operating on the same channel has exclusive permission to transmit data to a station that is able to receive data from the AP and the other co-located AP, prior to transmitting said data; and
only transmit the data to the station if no AP has said exclusive permission.

16. An access point according to claim 15 configured to:
if another AP has said exclusive permission, perform one or more of the following operations prior to transmitting the data to the station:
wait for the exclusive permission to be revoked,
lower transmit power, and
adjust one or more transmission beams to reduce the signal interference of the AP on the station.

17. The access point of claim 11, wherein the processor is further configured to perform the following steps if said determining is positive:
receive an exclusive permission token prior to transmitting the data to the station;
transmit the data to the station after receiving said exclusive permission token; and
relinquish the exclusive permission token after transmitting the data to the station.

* * * * *